United States Patent Office 2,883,276
Patented Apr. 21, 1959

2,883,276

FUEL CONTAINING ANTI-ICING ADDITIVES

Olaf E. Larsen, Bartlesville, Okla., assignor to Phillips Petroleum Company, a corporation of Delaware No Drawing. Application January 21, 1954
Serial No. 405,512

21 Claims. (Cl. 44—55)

This invention relates to a novel fuel composition. In one aspect, it relates to a method of operating an internal combustion engine. In another aspect, it relates to a method of preventing cold stalling of such an engine.

It has been observed that an internal combustion engine having a carburetor will stall while being warmed up when certain combinations of atmospheric temperature and humidity exist. This stalling, known as "cold stalling," is caused by the formation of ice on the throttle plate and adjacent parts of the carburetor, and especially around the idling jet and the throttle plate. The ice results from the cooling effect of the vaporization of fuel within the carburetor and from the pseudo-adiabatic expansion of carburetor air in the metering venturi and past the edges of the throttle plate, the cooling causing moisture in the incoming air to accumulate as ice in the carburetor. The accumulated ice prevents free flow of fuel and air to the cylinders. Cold stalling ordinarily occurs when the atmospheric temperature is in the range of about 30 to 60° F. and the relative humidity is greater than about 60 percent.

One prior art method of preventing cold stalling caused by ice formation in the carburetor involves the incorporation of isopropyl alcohol as an anti-icing agent into the fuel supplied to the engine. In road tests using four 1953 model automobiles operated in an ambient air temperature of 40° F. and supplied with air of 100 percent relative humidity, an average of 16 stalls for each car was encountered using a regular grade fuel not containing an anti-cold-stalling additive. The addition of 2 weight percent isopropyl alcohol to the fuel resulted in freedom from cold stalling in all of the automobiles under the conditions of the test, but the addition of only 1 weight percent isopropyl alcohol resulted in an average of 3 stalls in each of the four automobiles. More recent tests show that 2 weight percent of isopropyl alcohol, though effective, does not give complete freedom from stalling in all cases. The procedure used in the road test comprised starting and idling the engine, which was originally at the temperature of the ambient air, for a period of 20 seconds; driving the automobile at 20 miles per hour for 0.2 mile; stopping the automobile and idling the engine for 20 seconds; and repeating the driving, stopping, and idling procedure until three consecutive stall-free stops were obtained. Whenever the engine stalled, it was immediately restarted and driven for 0.2 mile at 20 miles per hour before another stop was made.

The present invention provides a method and a novel fuel composition, whereby the operational difficulties of cold-stalling and rough idling, encountered in connection with carburetted internal combustion engines, such as automotive, aircraft, marine engines, and the like, operated under cool, humid atmospheric conditions, are reduced. The invention provides a fuel composition which permits a carbuetted internal combustion engine to be operated at idling or light load conditions in atmospheric conditions of temperature in the range of 30 to 60° F. and relative humidity above about 60 percent without excessive stalling resulting from the formation of ice in the carburetor of the engine.

This invention provides a novel fuel composition comprising at least one hydrocarbon which boils in the gasoline boiling range and a minor proportion of a fatty acid salt of a polynuclear amine containing three condensed six-membered rings.

Further, according to the invention, cold stalling of an internal combustion engine is pevented by supplying to the carburetor of said engine, along with a hydrocarbon fuel, an amine salt of the type herein described. The amine salt can be supplied as a constituent of the hydrocarbon fuel, i.e. in solution or suspension therein, or it can be supplied from a separate source so that the use thereof can be discontinued when cold stalling conditions of temperature and humidity do not exist.

According to this invention, carburetor icing is substantially prevented by admixing with the fuel a small amount of a fatty acid salt of a polynuclear amine. The polynuclear amines from which these derivatives are formed contain three condensed six-membered carbocyclic rings. Preferably, one, and more preferably two of the aromatic rings are hydrogenated structures and can have alkyl radicals substituted on various carbon atoms of the fused six-membered rings. A preferred polynuclear amine is dehydroabietylamine, which is represented by the formula

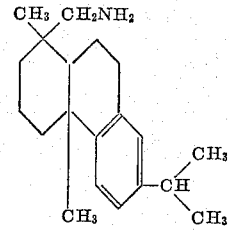

The fatty acids reacted with the polynuclear amine are long-chain fatty acids containing from 12 to 20 carbon atoms and include such fatty acids as lauric, myristic, palmitic, stearic, oleic, and the like. A preferred additive of this invention is the stearic acid salt of dehydroabietylamine which is a rosin derivative well known to those skilled in the art. The other additives according to this invention are also known compounds.

Compounds of the class of additives described above are effective for reducing carburetor icing and engine stalling when admixed in the hydrocarbon fuel in small amounts. However, the compounds described above can also be employed in combination with other compounds which have an anti-icing effect to obtain an improved anti-icing additive. Specific compounds which can be admixed with the additives of this invention are the monoalkyl ethers of the monoethylene, diethylene, and triethylene glycols and include ethylene glycol monoethyl ether (Cellosolve) and diethylene glycol monoethyl ether (Carbitol). Compounds which have no anti-icing effect by themselves can also be admixed with simple or combination anti-icing additives to increase the amount of these compounds which can be dissolved in the fuel. Methyl and ethyl alcohol can be used for this purpose. The amount of ether or alcohol is within the range stated for the amine salt additive.

The amount of the additives admixed with the engine fuel varies over a wide range and depends to some extent on the physical properties of the compounds. Usually, the concentration of the additive admixed with the fuel is less than 10 weight percent and the actual concentration depends on the solubility of the additive in the fuel. Very small concentrations have been found to have very effective anti-icing properties but usually the concentration is greater than 0.001 weight percent of the fuel. Preferably, the amount of additive used is in the range of 0.005 to 3.0 weight percent of the fuel and more preferably the concentration is in the range of 0.005 to 1.0 weight percent.

The anti-icing additives of this invention can be admixed with any carburetted internal combustion engine fuel and are of particular application to an engine fuel having a volatility such that the 50 percent distillation point falls below about 310° F. These fuels may be obtained from mineral oils or gaseous hydrocarbons derived from any source and by any of the known commercial methods of manufacture, such as straight-run distillation, catalytic cracking, thermal cracking, destructive hydrogenation, polymerization, alkylation, hydrogenation, or the like. The fuels may also contain commonly used fuel additives such as lead alkyl anti-detonants (e.g. tetraethyl lead), lead scavenging agents, dyes, gum inhibitors, oxidation inhibitors, and the like. The gasoline used should be substantially free of elemental sulfur. It should be "doctor-sweet." Generally, the fuel can be any desired hydrocarbon, or mixture of hydrocarbons, having a boiling point within the gasoline boiling range, i.e. 70 to 420° F., or it can be a liquefied petroleum gas, e.g. butane.

EXAMPLE

Cold starting tests were performed using a Carter carburetor, type WO–870S, mounted on a motored CFR supercharged aviation fuel test engine which served to draw the fuel through the carburetor and to dispose of the combustible fuel-air mixture. The carburetor was mounted in an insulated chamber and the air supplied to the carburetor had a temperature of 40° F. and 100 percent relative humidity. The air was supplied at a rate of 0.58 pound per minute and the air-fuel ratio of the combustible mixture varied between 8:1 to 10:1. The CFR engine was operated at constant speed of 200 r.p.m. with 6 inches Hg manifold vacuum. The base fuel used in the tests was an unleaded automotive gasoline having a Reid vapor pressure of 14.0 lb. and the following ASTM distillation (° F.):

| | |
|---|---|
| Initial | 79 |
| 10% | 96 |
| 20% | 109 |
| 40% | 138 |
| 60% | 186 |
| 80% | 264 |
| Final | 392 |

In the anti-icing tests, the fuels were cooled to a temperature of 40° F. and maintained at that temperature while being supplied to the carburetor.

In the test procedure, the CFR engine was operated on the injected fuel at a constant speed of 2000 r.p.m. and then the injected fuel flow rate was reduced as the test fuel was admitted to the engine through the carburetor to maintain the constant 2000 r.p.m. engine speed. The length of time was measured from the start of the flow of test fuel to the carburetor to the point where the ice buildup on the throttle plate and adjacent parts of the carburetor was sufficient to raise the manifold vacuum 2 inches of mercury. For purposes of evaluating the anti-icing qualities of the additives of this invention, these icing tests were also performed on a test fuel containing isopropyl alcohol.

The anti-icing characteristics of several of the additives of this invention are given in Table I and compared to the anti-icing effect of other additives. In obtaining these data, the base fuel was tested with several concentrations of additive and the concentration of additive equivalent in anti-icing quality to 1.5 or 2.0 wt. percent isopropyl alcohol was determined.

Table I

| Additive | Concentration in Weight Percent Equivalent to 1.5 wt. Percent Isopropyl alcohol | Concentration in Weight Percent Equivalent to 2.0 wt. Percent Isopropyl alcohol |
|---|---|---|
| 10 vol. Percent Rosin Amine D. Stearate [1] 90 vol. Percent Methanol | | 0.45 |
| 12.5 vol. Percent Rosin Amine D. Stearate [1] 37.5 vol. Percent Diethylene Glycol Monomethyl Ether 50.0 vol. Percent Methanol | 0.05 | |
| 50 vol. Percent Rosin Amine D. Stearate [1] 50 vol. Percent Methanol | 0.085 | |
| Tetrahydrofurfuryl Alcohol | 0.16 | 0.23 |

[1] Commercially available stearic acid salt of dehydroabietylamine.

The data indicate that small amounts of the additives according to this invention are more effective in preventing carburetor icing than are much larger amounts of isopropyl alcohol, an additive known in the art. Tests conducted with methanol as the sole anti-icing additive indicate that it is only very slightly more effective than isopropyl alcohol, the difference being so slight that the two alcohols are substantially equivalent.

While certain compositions, process steps, structures and examples have been described for purposes of illustration, the invention, clearly, is not limited thereto. The essence of the invention is a composition comprising at least one hydrocarbon which boils in the gasoline boiling range and a minor proportion, effective to reduce carburetor icing, of a carboxylic acid salt of a polynuclear amine having three condensed six-membered rings in the molecule; and a method comprising supplying such an amine salt to the carburetor of an internal combustion engine, together with such a hydrocarbon fuel, to prevent cold stalling of said engine. Variation and modification within the scope of the disclosure and the claims to this invention are possible, as will be recognized by those skilled in the art.

I claim:

1. A fuel composition, comprising as a major component at least one hydrocarbon suitable as a fuel for an internal combustion engine having a carburetor and a minor proportion, effective to prevent cold stalling of such an engine, of a fatty acid salt of a polynuclear hydrocarbon amine containing three condensed, six-membered rings two of which rings are hydrogenated, said acid containing from 12 to 20 carbon atoms per molecule.

2. A fuel composition, comprising a gasoline as a major component and containing in solution from 0.001 to 10 weight percent, based on the total composition, of a fatty acid salt of dehydroabietylamine, wherein said acid contains from 12 to 20 carbon atoms per molecule and said amine contains three condensed six-member carbocyclic rings.

3. A composition according to claim 2 wherein the concentration of said salt is from 0.005 to 3.0 weight percent.

4. A composition according to claim 2 wherein said amine is dehydroabietylamine.

5. A composition according to claim 2 wherein the amount of said salt is from 0.005 to 1.0 percent and said salt is the stearic acid salt of dehydroabietylamine.

6. A composition according to claim 2 containing from 0.005 to 1.0 weight percent of the lauric acid salt of dehydroabietylamine.

7. A composition according to claim 2 containing from 0.005 to 1.0 weight percent of the myristic acid salt of dehydroabietylamine.

8. A composition according to claim 2 containing from 0.005 to 1.0 weight percent of the palmitic acid salt of dehydroabietylamine.

9. A composition according to claim 2 containing from 0.005 to 1.0 weight percent of the oleic acid salt of dehydroabietylamine.

10. A composition according to claim 2 contining from 0.005 to 1.0 weight percent of a mixture of methanol and the stearic acid salt of dehydroabietylamine, said salt being present in an amount sufficient to materially reduce cold stalling when the composition is supplied to the carburetor of an internal combustion engine under cold stalling conditions.

11. A composition according to claim 2 containing from 0.005 to 1.0 weight percent of a mixture of methanol, the monomethyl ether of diethylene glycol, and the stearic acid salt of dehydroabietylamine, said salt being present in an amount sufficient to materially reduce cold stalling when the composition is supplied to the carburetor of an internal combustion engine under cold stalling conditions.

12. A composition according to claim 2 containing from 0.005 to 1 weight percent of methanol, from 0.005 to 1 weight percent of monomethyl ether of diethylene glycol and from 0.005 to 1 weight percent of the stearic acid salt of dehydroabietylamine.

13. A composition according to claim 2 containing from 0.005 to 1 weight percent of methanol and from 0.005 to 1 weight percent of the stearic acid salt of dehydroabietylamine.

14. An internal combustion engine fuel comprising as a major component a hydrocarbon fraction which boils within the gasoline range and has a 50 percent distillation point below 310° F. and a minor proportion, effective to prevent cold stalling of such an engine, of dehydroabietylamine stearate.

15. A hydrocarbon fuel suitable as a fuel for an internal combustion engine having a carburetor comprising as a major component a hydrocarbon fraction which boils within the gasoline boiling range and has a 50 percent distillation point below 310° F. and a minor proportion, effective to prevent cold stalling of such an engine, of a salt of dehydroabietylamine and a fatty acid containing from 12 to 20 carbon atoms per molecule.

16. A hydrocarbon fuel suitable as a fuel for an internal combustion engine having a carburetor comprising as a major component at least one hydrocarbon and a minor proportion, effective to prevent cold stalling of such an engine, of a salt of dehydroabietylamine and a fatty acid containing from 12 to 20 carbon atoms per molecule.

17. As an additive for a hydrocarbon fuel suitable as a fuel for an internal combustion engine having a carburetor, a mixture comprising a fatty acid salt of a polynuclear hydrocarbon amine containing three condensed 6-member carbocyclic rings in the molecule, of which at least two rings are hydrogenated, and a monoalkyl ether of an ethylene glycol, said acid having from 12 to 20 carbon atoms per molecule and the proportion of said salt being sufficient to prevent cold stalling of said engine when used in said fuel.

18. A method of operating an internal combustion engine which method comprises supplying to the carburator of said engine, simultaneously with a gasoline, a small proportion, effective to prevent the stalling of said engine resulting from ice deposition in said carburetor, of a fatty acid salt of a hydrocarbon amine containing three condensed six-carbon rings in the molecule, two of said rings being hydrogenated.

19. A method according to claim 18 wherein said fatty acid contains from 12 to 20 carbon atoms per molecule, said amine is dehydroabietylamine, and the amount of said salt is in the range 0.005 to 1.0 weight percent of the total fuel supplied.

20. In the operation of an internal combustion engine at cold idling conditions at an atmospheric temperature in the range 30 to 60° F. and a relative humidity greater than 60 percent, the method of preventing stalling of said engine as a result of ice formation in the carburetor thereof, which method comprises supplying to said carburetor, as a constituent of the gasoline, from 0.005 to 1.0 weight percent of a stearic acid salt of dehydroabietylamine.

21. A method of operating an internal combustion engine which method comprises supplying to the carburetor of said engine, under atmospheric conditions at which cold stalling would otherwise occur, a gasoline and from 0.005 to 3 weight percent, based on the weight of total fuel, of a salt of dehydroabietylamine and a fatty acid having from 12 to 20 carbon atmos per molecule and thus materially reducing the frequency of cold stalling of said engine.

References Cited in the file of this patent

UNITED STATES PATENTS

| | | |
|---|---|---|
| 2,484,010 | Bried | Oct. 11, 1949 |
| 2,579,692 | Neudeck | Dec. 25, 1951 |
| 2,599,338 | Lifson et al. | June 3, 1952 |
| 2,600,113 | Jones et al. | June 10, 1952 |
| 2,668,522 | Hickok et al. | Feb. 9, 1954 |
| 2,706,677 | Duncan et al. | Apr. 19, 1955 |

UNITED STATES PATENT OFFICE

CERTIFICATE OF CORRECTION

Patent No. 2,883,276                                              April 21, 1959

Olaf E. Larsen

It is hereby certified that error appears in the printed specification of the above numbered patent requiring correction and that the said Letters Patent should read as corrected below.

Column 1, line 71, for "carbuetted" read -- carburetted --; column 2, line 11, for "pevented" read -- prevented --; line 56, for "monalkyl" read -- monoalkyl --; column 3, line 39, for "200 r.p.m." read -- 2000 r.p.m. --; column 5, line 4, for "contining" read -- containing --; column 6, line 37, for "atmos" read -- atoms --.

Signed and sealed this 5th day of January 1960.

(SEAL)
Attest:

KARL H. AXLINE                                                            ROBERT C. WATSON
Attesting Officer                                            Commissioner of Patents